United States Patent
Davis, Jr. et al.

(10) Patent No.: US 8,735,746 B2
(45) Date of Patent: May 27, 2014

(54) WEIGHING APPARATUS AND METHOD

(75) Inventors: Thornton Russell Davis, Jr., Albany, CA (US); James Xuong Gia Nguyen, Union City, CA (US); Glenn Hayes, Hayward, CA (US)

(73) Assignee: Campbell Wrapper Corporation, Depere, WI (US)

( * ) Notice: Subject to any disclaimer, the term of this patent is extended or adjusted under 35 U.S.C. 154(b) by 607 days.

(21) Appl. No.: 13/004,108

(22) Filed: Jan. 11, 2011

(65) Prior Publication Data

US 2011/0168455 A1 Jul. 14, 2011

Related U.S. Application Data

(60) Provisional application No. 61/293,977, filed on Jan. 11, 2010.

(51) Int. Cl.
*G01N 1/20* (2006.01)
*G01G 17/06* (2006.01)
*G01G 13/00* (2006.01)

(52) U.S. Cl.
USPC ............ 177/50; 73/863.51; 177/116; 222/77

(58) Field of Classification Search
USPC .................. 177/116–122, 50; 222/55, 56, 77; 141/83; 73/863, 863.51
See application file for complete search history.

(56) References Cited

U.S. PATENT DOCUMENTS

| | | | | | |
|---|---|---|---|---|---|
| 2,361,267 A | * | 10/1944 | Clifford | ...................... | 198/369.2 |
| 2,844,349 A | * | 7/1958 | Hudson | ......................... | 177/122 |
| 4,092,721 A | * | 5/1978 | Rueff et al. | ................... | 700/240 |
| 4,494,619 A | * | 1/1985 | Matsuno | ..................... | 177/25.18 |
| 4,627,012 A | * | 12/1986 | Yamada | ......................... | 700/305 |
| 4,715,412 A | * | 12/1987 | Perazzo | ............................ | 141/1 |
| 4,867,343 A | * | 9/1989 | Ricciardi et al. | ................... | 222/1 |
| 5,110,521 A | * | 5/1992 | Moller | ......................... | 264/40.4 |
| 5,300,736 A | * | 4/1994 | Ehrhardt | ....................... | 177/145 |
| 5,753,867 A | * | 5/1998 | Konishi et al. | ............. | 177/25.18 |
| 6,210,727 B1 | * | 4/2001 | Miller et al. | .................. | 426/231 |

* cited by examiner

*Primary Examiner* — Randy W Gibson
(74) *Attorney, Agent, or Firm* — Wood, Phillips, Katz, Clark & Mortimer

(57) ABSTRACT

A method for operating a weighing apparatus and system contemplates that the system is operated in a ratio of two modes of operation, including a first, non-sampling mode, and a second, sampling mode. Operating in the first mode, wherein verification of a dose weight is not effected, promotes high cycle rates. Operation in the second, sampling mode requires operation at a slower cycle rate, but permits optimization of the accuracy of the overall weighing process. Operation in the two modes of operation, and adjustment of the ratio of the modes of operation, promotes optimization of weighing accuracy and cycle speeds.

9 Claims, 3 Drawing Sheets

WEIGHING APPARATUS AND METHOD

FIELD OF THE INVENTION

This disclosure concerns apparatus and methods for a weighing machine referred to as a linear or fill-to-cutoff weigher (to distinguish it from a combination weigher) that is used for dosing material by weight. The weigher typically discharges the weighed doses into a container or a packaging machine.

In accordance with the present invention, rather than provide automatic weight correction continually during operation of the weighing apparatus, the apparatus can be operated in both sampling and non-sampling modes. This permits periodic adjustment to the apparatus for optimizing the accuracy of quantities of dispensed product, while minimizing operation in the sampling mode, having a lower cyclic rate of operation. Manual or automatic adjustment of a ratio of the two modes of operation is contemplated to facilitate optimized efficiency.

BACKGROUND OF THE INVENTION

A linear weigher has a weigh bucket mounted to a weight-sensing device with a controller that continuously records the net weight in the weigh bucket. A material feed device, such as a vibratory feeder or a gated hopper, dispenses material into the weigh bucket on command. During the filling cycle, the material from the feed device accumulates in the weigh bucket until the recorded weight equals a preset Dribble Cut-off Weight value, at which point the feed device is signaled to stop. The weigh bucket now contains an approximation of the desired weight of material. The material in the weigh bucket (dose) is then released into a container or packaging machine. The feed device is then signaled to dispense material and the weighing process is repeated.

Where the material is discrete particles of uniform individual weight, such as electrical or mechanical hardware, the weigher may be used to batch by number (count).

The linear weigher described is often referred to as a net weigher. However this invention is not limited to this type. Another type is a gross weigher where the container is placed on a weighing device and the container is filled directly by the material feeder. At the start of the weighing cycle, the empty container weight is recorded (tare weight) so that all subsequent measurements represent the weight of the material in the container. The filling cycle is identical to that described above. At the completion of the filling cycle, the filled container is moved from the weighing device and an empty container is placed for the next cycle.

To achieve higher discharge rates, multiple weighing units are mounted over a common collection funnel to direct dosed material to the container or packaging machine. The weighing units discharge sequentially into the collection funnel to achieve the desired dose rate. Typically a single controller, such as a Programmable Logic Controller (PLC) or microprocessor-based computer, controls and synchronizes all weighing units.

Most linear weighers incorporate a multi-stage feed system to increase the cycle rate by decreasing the filling time. A typical arrangement incorporates two feed devices, a bulk and dribble feed. The bulk feed dispenses material at a high rate and cuts-off at a preset Bulk Cutoff Weight value, which is less than the preset Dribble Cutoff Weight value. The dribble feed then continues until the preset Dribble Cutoff Weight is reached. Regardless of the number and configuration of the multi-stage feed system, the accuracy of the final weight in the weigh bucket is determined by the material flow characteristics of final feed stage, in this description the dribble feed.

Modern controllers can record the weigh signal with great accuracy. In fact the repeatability and accuracy from one weighing cycle to the next is determined by the constancy of the material flow rate at the dribble cut-off, and the repeatability of the feed device cut-off. These variables result in dose weights that deviate from the desired weight referred to as the Target Weight. This deviation approximates a normal curve (bell shaped), therefore the accuracy of a linear weigher is commonly specified as a weight variation at a standard deviation of 2 sigma. Ideally the average dose weight should equal the Target Weight. The Dribble Cutoff Weight is adjusted so that the average final weight in the bucket equals the Target Weight.

There are intrinsic operating conditions that cause the average dose weight to drift from the desired Target Weight. For example, there is a column of material from the outlet of the feed device to the pile of material accumulating in the weigh bucket, and any change in the weight of material in this column will affect the final dose weight. Should the bulk density of the material increase, then the weight of material in the column is higher, resulting in a dose weight greater than the desired Target Weight. This situation incurs monetary and efficiency losses due to overpack in each container. Should the material bulk density decrease then containers below the Target Weight may be produced that do not comply with consumer legislation.

The drift in the average weight is typically gradual because the underlying causes change slowly. To address this, an Automatic Weight Correction (AWC) feature has been incorporated in linear weighers for many years, which is a method to automatically adjust the weigher's operating parameters so that the average dose weight is maintained relative to the preset Target Weight. This feature minimizes changes in the average discharge weight caused by changes in product flow or density and other factors.

The AWC compensation process records the final weight after the filling process is completed, then calculates a correction value derived from the difference between the final weight and the Target Weight. This correction value is applied to the weigher's operating parameters so that the average discharge weight of subsequent weighing cycles is closer to the Target Weight.

To accurately record the final weight in the weigh bucket it is necessary to wait a period of time after the dribble feed cut-off before recording the final weight. This time allows the column of material in transit from the material feeder to be deposited in the weigh bucket and for the accumulated pile of material to stabilize. Also time is needed for the electrical and mechanical dampening, commonly used to suppress environmental vibration, to reach a steady-state weight value. This time is referred to as the Settle Time and after this delay, the weight in the weigh bucket can be recorded as the final weight. At the completion of this process, the weigher is ready to discharge the dose.

The Settle Time delay needed to record an accurate final weight for the AWC process is a substantial part of the cycle time of the weighing cycle. For example, a typical application may have the following (time in milliseconds):

| Without AWC | |
| --- | --- |
| Filling time (bulk and dribble feed) | 3000 |
| Bucket discharge time | 350 |
| Total cycle time | 3350 |
| Cycle rate | 18 doses per minute |
| With AWC | |
| Filling time (from above) | 3350 |

| | |
|---|---|
| Settle Time | 800 |
| Total cycle time | 4150 |
| Cycle rate | 14 doses per minute |

In the above example, if the dosing application requires 54 dose per minute without AWC, then three weighing units are required. However, with AWC four weighing units are required, which adds considerable expense and complexity. For high accuracy weighing or applications that require extra weigh signal dampening (filtering), the Settle Time can be significantly more than that shown above.

It is an object of the present invention to provide a faster means to accomplish an effective Automatic Weight Control. By employing the apparatus and methods disclosed, many weigher applications can be implemented with a reduced number of weighing units resulting in substantial savings in cost and complexity. At a minimum, an existing weigher will have higher throughput.

SUMMARY OF THE INVENTION

In accordance with the present invention, a method of cyclically weighing quantities of flowable product contemplates that a weighing apparatus can be selectively operated in two distinct modes of operation, that is, a sampling mode and a non-sampling mode. During normal operation in the non-sampling mode, quantities of the product are dispensed from a weighing device of the apparatus when a predetermined dose weight is received in the weighing device. This permits the apparatus to cyclically operate at a relatively high cycle rate. In order to optimize the correlation between the dose weight and a desired target weight, the apparatus can be operated in the second, sampling mode, wherein each dose weight is compared to the target weight, in operation of the apparatus adjusted accordingly. Preferably, the apparatus is operated at the relatively lower rate of the second, sampling mode for time periods which are much less than those time periods during which it is operated in the first, non-sampling mode. In this fashion, the overall filling rate, and weighing accuracy of the apparatus can be optimized.

In accordance with the present invention, a method of cyclically weighing quantities of flowable product comprises the steps of providing a feeder for supplying a stream of product, and a weighing device for weighing a quantity of the product. The feeder is cyclically operated to periodically feed a quantity of the product from the feeder to the weighing device to provide a dose weight of the product. The method includes cyclically dispensing the quantity of product which provides the dose weight from the weighing device.

In accordance with the present invention, the feeder and weighing device are operated in a ratio of two modes of operation, including a first, non-sampling mode, and a second, sampling mode of operation. During the first, non-sampling mode, the quantity of material is dispensed from the weighing device without verification of the dose weight. In contrast, during the second, sampling mode of operation, the quantity of material is dispensed from the weighing device only after the dose weight of the quantity of product has been verified by comparison to a target weight. Because this requires stabilization of the quantity of product and the weighing device prior to verification, each cycle of operating during the second, sampling mode is longer than each cycle of operation during the first, non-sampling mode. Optimization of the overall cycle rate is achieved by operating the apparatus in the non-sampling mode of operating for greater periods of time than in the second, sampling mode of operation. In fact, it is contemplated that the apparatus be operated in the second, sampling mode of operating no more than about 20% of the time of operation, and preferably no more than 5%, or less, of the time of operation. It is contemplated that this ratio of the two modes of operation can be manually or automatically adjusted to optimize performance.

Depending upon the specifics of the weighing system, the present method contemplates that different types of adjustment can be effected, based upon the data collected during the second, sampling mode of operation. For example, the dose weight of the product can be adjusted in response to the variation of the dose weight from the target weight, as determined by verification of the dose weight in the second mode of operation. In contrast, the rate at which the feeder supplies product to the weighing device can be adjusted in response to the variation of the dose weight from the target weight, as determined by the verification of the dose weight in the second mode of operation.

A further aspect of the present invention relates to adjustment of the ratio of the two modes of operation of the weighing system. This aspect of the present invention contemplates that the ratio of the first mode of operation versus the second mode of operation can be manually set (input), with a value entered as determined "off-line" as the best compromise between production rate, and tolerable weight drift from the desired target weight. Alternatively, the ratio of the first mode versus the second mode can be automatically adjusted based upon calculations from dispensed weight data acquired during the second mode of operation, in criteria provided (input) by the user thus, a self-optimizing feed-back loop replaces manual adjustment of the ratio of the two modes of operation.

As will be recognized by those skilled in the art, the present invention finds applicability to a wide range of different weighing systems and apparatus. The method can be practiced with a so-called linear weigher, which includes a weigh bucket mounted to a weight-sensing device, which receives the product to be dispensed, and cyclically dispenses it from the weigh bucket for subsequent packaging or the like. The present invention can also be practiced for operation of a so-called gross weigher, where a container for packaging the product is placed on the weighing device, and the container filled directly from the product feeder.

Other features and advantages of the present invention will become readily apparent from the following detailed description, the accompanying drawings, and the appended claims.

DETAILED DESCRIPTION

Figure 1:
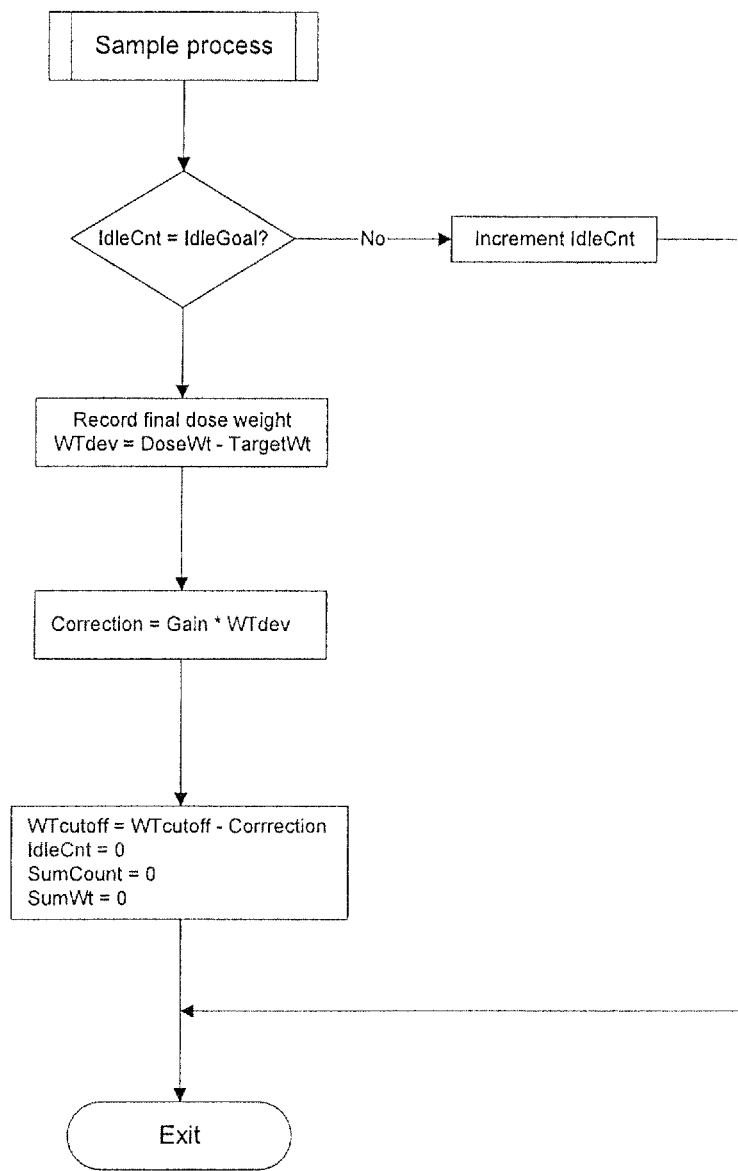
FIG. 1 is a flow diagram illustrated a method of operating a weighing apparatus in accordance with the principals of the present invention.
Figure 2:
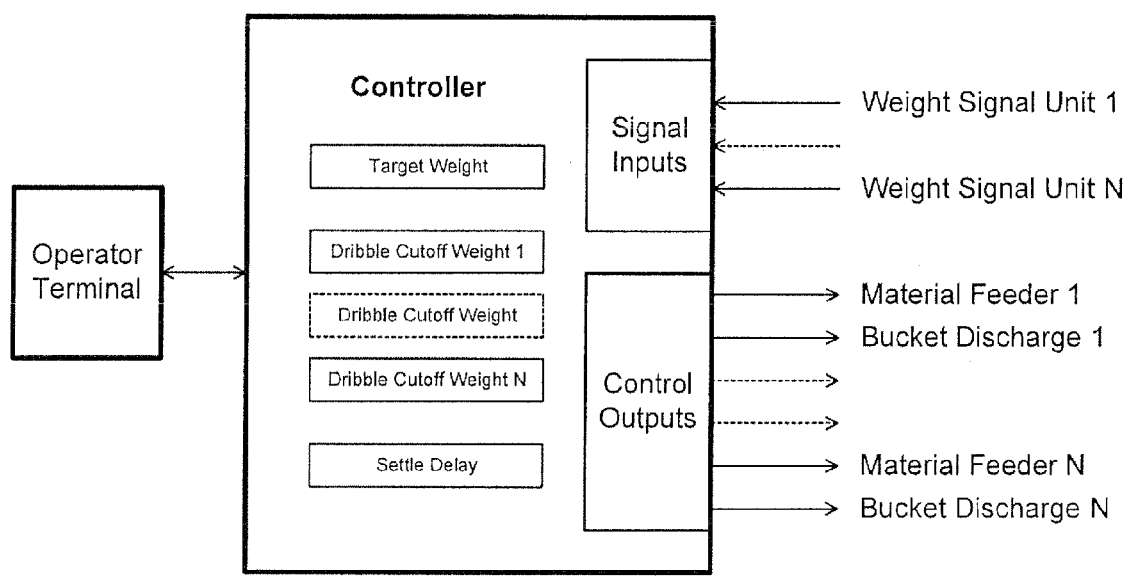
FIG. 2 is a diagrammatic view of a programmable logic controller ("PLC") as can be used for practice of the present invention.
Figure 3:
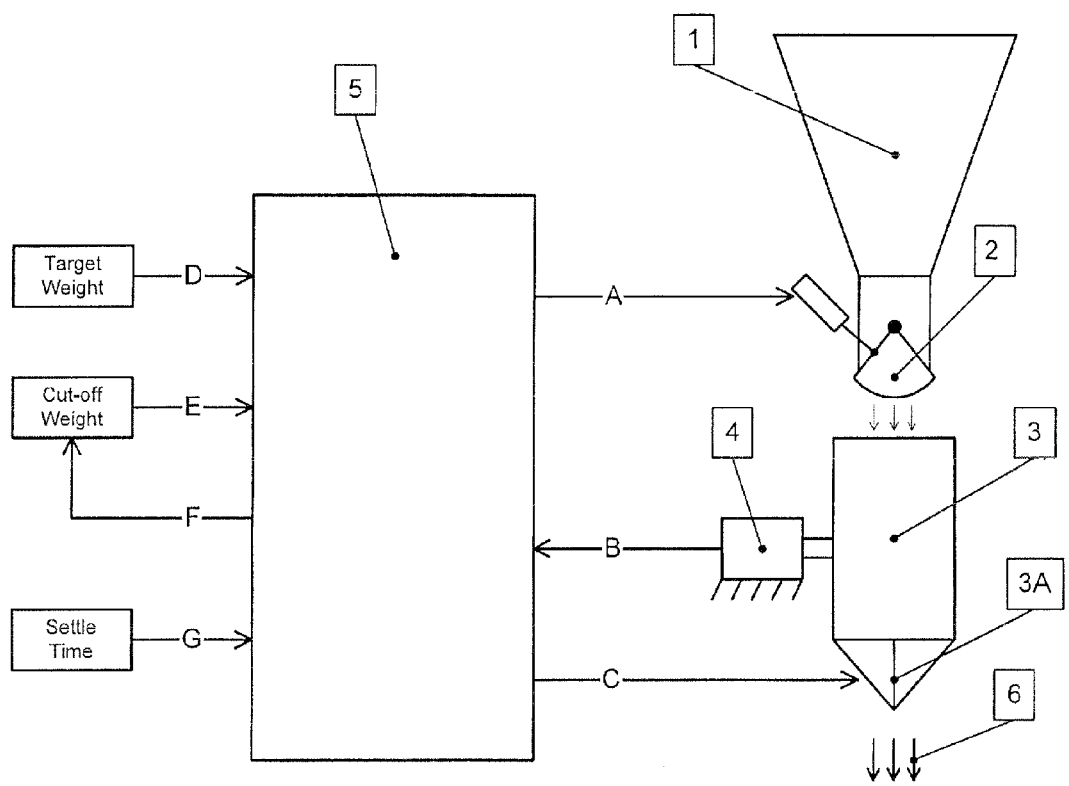
FIG. 3 is a diagrammatic view of a weighing apparatus and associated control system for practice of the present invention.

While the present invention is acceptable in embodiment in various forms, there is shown in the drawings and will hereinafter by described a presently preferred embodiments, with the understanding that the present disclosure is to be considered as a exemplification of the invention, and is not intended to limit the invention to the specific embodiments disclosed herein.

The present invention is directed to a method of operating a weighing apparatus or weighing system which cyclically dispenses quantities of a flowable product, typically for subsequent packaging or the like. While it is recognized by those skilled in the art that cyclically operable weighing apparatus can be operated without regular automatic weight correction, in order to optimize cycle rates, automatic weight correction can be employed to optimize the accuracy of the dispense quantities of product. However, such automatic weight correction, which typically entails verification of each dispensed quantity of product by comparison of a dose weight to a target weight, ordinarily acts to increase the cycle time for the apparatus, slowing throughput of the weighing system.

The present invention contemplates operation of a weighing apparatus or system in a ratio of two distinct mode of operation, that is, a first non-sampling mode, and a second sampling mode. By operation in this fashion, the weighing apparatus can be ordinarily operated at a relatively high non-sampling cycle rate for the majority of time of operation, preferably as much as 80% of the time, and more preferably greater than 95% of the time. The accuracy of the dispensed quantity of product is enhanced by periodically operating the weighing apparatus in the second, sampling mode of operation, wherein the dose weight of each quantity of product is verified by comparison to a predetermined target weight. Appropriate adjustments to the weighing apparatus can be made in response to this comparison, such as by adjusting the dose weight, and/or adjusting the rate at which product is feed to the weighing device of the apparatus. Because adjustments to the operation of the system are effected only periodically, corrective action can be taken which is sufficiently aggressive as to optimize the accuracy of the overall weighing system, while at the same time optimizing the cycle rate.

The dose weight from a linear weigher tends to drift due to changes in material flow rate. Flow rate changes can be the result of changes the material's characteristics, such as:
Particle size;
Particle texture or shape; and
Product density.

Changes in material flow rate can also be due to changes in the material feed device, such as:
Accumulation of material on the surfaces, restricting flow;
Change in the reaction time of the flow cut-off device, such as an air cylinder; and
Feed device changes such as the effect of ambient temperature on a vibratory feeder or changes in power supply voltage.

Many years of operational experience has shown that the drift in average dose weight from the Target Weight is gradual and that only small corrections are required at any given time.

Low cost weighers depend on the operator to adjust the Dribble Cut-off Weight, or some means of adjusting the dribble flow rate, to compensate for the drift in the average dose weight from the desired Target Weight. Typically these low cost weighers do not automatically record the final dose weight, rather the operator is required to periodically weigh the discharged doses, usually a small sample count, on a secondary check scale and then determines the direction and magnitude of deviation from the Target Weight. The operator then performs a manual adjustment that will result in the average dose weight to be closer to the Target Weight, at least at that point in time.

More advanced weighers automatically perform adjustments so that the average dose weight approximates the Target Weight. To accomplish this the final dose weight is recorded and compared to the Target Weight. Then a fraction of this difference is applied so that the average dose weight more closely approximates the Target Weight. This automatic correction process is at the expense of dosing rate, since the process of recording the final dose weight in the bucket prior to discharge takes significant time.

This invention discloses an apparatus and method of substantially improving the average cycle rate of a weigher while incorporating the benefits of automatic weight correction.

As mentioned above, the drift in the average dose weight tends to be gradual over time. Therefore it is not necessary to record the final dose weight of every weighing cycle. Rather a more efficient method is to sample the dose weights periodically (sampling phase) at which time a correction is computed and applied that will cause the average dose weight too more closely approximate the Target Weight.

While not sampling the final dose weight (non-sampling phase), the weigher will cycle at a high rate, substantially improving throughput. During the sampling phase the weigher cycle rate will decrease due to the time necessary to record the final weight of each dose. At the completion of the sampling phase, the weigher will return to the high-speed non-sampling phase.

An object of this invention is to minimize the time (doses) required for the sampling phase. Additionally the period of the non-sampling phase can be set, manually or automatically, dependent on the characteristics of the material being dosed and the feeder characteristics. Therefore the throughput of the weigher can be optimized for the application and operating characteristics.

The methods disclosed can be readily adapted for a broad range of applications. By their nature, linear weighers are designed and constructed to operate for a specific range of materials to be dosed. A common practice is to customize the material feeder and other elements for the specific material(s) to be dosed. In a like manner, the method utilized to derive the correction to the average dose weight (sampling phase) may be customized for specific material and feeder characteristics. These specialized solutions are just other ways of implementing the invention.

The apparatus for practice of the present invention comprises:
1. A feeder means for delivering material to a weigh bucket, or for a gross weigher the container;
2. Means for controlling the flow of material from the feeder means;
3. A weigh bucket means that receives material from the feeder means and that has a discharge means to release material (this is not needed for gross weighing);
4. A weight sensor means that provides a signal relative to the weight of material in the weigh bucket means;
5. Controller means that records weight from the weight sensor means;
6. Input means for entry or reading of various operating parameters, such as Target Weight and Settle Time;
7. Output means to control the flow of material from the feeder means;
8. Output means to control the release of material from the weigh bucket means;
9. A computational means and timing; and
10. Preferably a display means for indicating operating parameters and performance.

The Automatic Weight Correction feature comes at the expense of weigher cycle rate. This is due to the time interval between the completion of the filling process to the point in time that the weight signal has stabilized in order to record an accurate final weight value. This "Settling Delay" adds significant time to the weigher's cycle time, resulting in a decrease in cycle rate.

If the time incurred for the Automatic Weight Correction can be reduced, the productivity of the weigher will increase. In many applications, this increased productivity will allow a reduction in the number of weighing units previously required, resulting in a considerable cost reduction while reducing system complexity.

The linear weigher has a weigh bucket mounted on a weight-sensing device, typically a strain gauge load cell. A material feeder, such as a gated gravity-feed or vibratory feeder, dispenses material into the weigh bucket. As the feeder dispenses material it accumulates in the weigh bucket, producing an increasing weight signal. When the weight signal reaches a preset Cut-off Weight value the material feeder is turned off, stopping its flow.

The Cut-off Weight value is adjusted to compensate for the electrical and mechanical delay in the material feeder stopping the flow of material and for the amount of material dropping from the feeder to the pile in the weigh bucket. This is commonly referred to as in-flight compensation. This compensation requires that the Cut-off Weight value be set less than the Target Weight, the desired discharge weight.

To maintain discharge weights close to the Target Weight, the Cut-off Weight value must be adjusted for changes in feeder flow rate, material characteristics that affect flow rate, material density changes, and other factors.

Modern linear weighers add an additional cycle to the weighing process for automatic adjustment of the Cut-off Weight value. This is accomplished by adding a Settling Time delay after the feeder cut-off has occurred. At the end of this delay, the weight signal is recorded and compared to the Target Weight. If the weight signal value is not equal to the Target Weight then the Cut-off Weight is adjusted. For example, weight value is greater then the Target Weight, then the Cut-off Weight value will be decreased to reduce the discharge weight on subsequent cycles.

Typically these combined changes do not occur suddenly, rather they change slowly during production.

The basic linear weigher consists of the following elements
 A product feed device [2] that, on command [A], delivers product to the weighing bucket [3]. The figure has a hopper [1] to ensure that there is adequate product during the weighing cycle.
 A bucket [3], with a discharge door [3A], attached to a weight sensing device [4].
 A controller [5] that records the weight signal [B] in the bucket from the weight sensing device, commands the feed device, and signals the bucket discharge door.

The typical sequence of operation follows. This sequence starts with the bucket empty, or zero measured weight.
 The feed device is turned on so that product flows into the weigh bucket.
 When the measured weight from the weight sensing device reaches a preset value, close to the desired final weight, the feed device is turned off.
 When the packaging machine is ready, the bucket discharge door is opened thereby dropping the weighed product dose into the package.
 The bucket discharge door is closed
 The cycle is repeated
 The final weight is adjusted by the preset cut-off weight value.

For higher production rates, weigher units are added. For example, if a single weigher unit is capable of 15 discharges per minute, then two units will deliver 30 discharges per minute. The weigher units are mounted over a common discharge funnel that directs the product from any of the weigher units to the packager. The weigher units discharge sequentially so that only one unit discharges for each packager cycle.

While simple, the above embodiment does not address factors that influence the discharged weight. Any change if the flow rate or timing will affect the final weight. For example:
 Bulk density changes in the product;
 Flow characteristics of the product;
 Changes in product flow rate from the feed device. For example, product accumulating to the flow surfaces reducing the normal flow; and
 Variation in reaction time of feed device when stopping the flow of product.

These changes in product feed flow rate tend occur slowly during operation. The result is that the discharged weight tends to drift over time.

More advanced weighers, like the Parsons-Eagle EVM Weigher, automatically compensate for changes in the feed device and product flow rate by adding a check weight step to the sequence of operation as follows.

When the weight in the bucket reaches the preset value the feed device is signaled off, the apparatus is operated as follows:
 A Settling Time delay is initiated. This delay includes the time for the feed device to stop product flow, for the product to fall from the outlet of the feed device into the bucket, and for the product in the bucket to stop moving;
 At the end of the Settling Time delay, the weight in the bucket is measured and stored; and
 The measured weight is compared the Target Weight value and the difference is the Deviation Weight.

The Deviation Weight can be used to adjust the Preset Cut-off Weight to compensate for the flow rate variations mentioned above. For example, if the Deviation Weight is positive, that is the weight in the bucket is greater than the Target Weight, then the preset cut-off weight can be decreased. This will result in a decrease in the weight in the bucket on subsequent weighing cycles.

For those skilled in the art, it will be recognized that there are other methods of compensation. For example, rather than adjusting the preset cut-off weight, the flow rate of the material feeder can be adjusted. Since the material feeder design is highly dependent on the material being handled there are numerous implementations. Two common types are the vibratory feeder and gravity feed gate. The flow rate is adjusted by setting the amplitude of a vibratory feeder drive or the open position for a feed gate. The present invention can be applied to any material feeder that that has a variable flow rate adjustment means.

Any method and algorithm for weight correction compensation will apply to the method disclosed.

The aforementioned features provided by measuring the Deviation Weight are realized at the expense of the weighers cycle rate. Since the Settling Time delay adds to the overall time per weighing cycle the productivity of the weigher is compromised. For this reason, multiple weigher unit scales are required.

This invention teaches a weight compensation method that reduces the number of weighing units required for a given production rate. The result is a substantial reduction in cost and complexity, without compromising performance.

Thus, a linear weighing apparatus for practice of the present invention comprises a feeder means for delivering material to a weigh bucket, or to the container of a gross weigher, and means for controlling the flow of material from the feeder means. A weigh bucket means of the apparatus receives material from the feeder means, and can have discharge means to release material in the case of a weigh bucket (which is not needed for a gross weighing apparatus).

A weight sensor of the apparatus provides a signal relative to the weight of material in the weigh bucket means or the gross weigher. A controller is provided that records weight from the weight sensor means, with input means provided for entry and reading of various operating perimeters.

Output means controls the flow of material from the feeder means, and controls the release of material from the weigh bucket means. Suitable computational and timing means are provided, with a sampling means provided to record the settled weight in the weigh bucket means. Computational means are provided to compare the Target Weight to the settled weight, with adjustment means provided for correction of the average weight of subsequent dosing cycles. Suitable logic means are provided to disable the settled weight sampling means to permit operation in the non-sampling mode. Preferably, display means are provided for indicating operating perimeters and performance of the system.

Output control means can be provided to signal an external packaging machine, as can be desired for many applications.

Operation of the present system contemplates that a correction is derived based upon the collection of one or more settled weight samples of sequential dosing cycles. The process of sampling the settled weight, and all attendant process delays at the completion of the correction process can be disabled for practicing the non-sampling mode of operation. This enables the settled weight sampling and attendant correction of the completion of a preset number of dosing cycles without settled weight sampling.

It is contemplated that adjustment, either positive or negative, can be applied to the number of dosing cycles without settled weight samples, based on analysis of the prior settled weight samples. Adjustment of the number of settled weight samples based on the stored results of previous settled weight samples against preset criteria can also be effect.

The present method can be practiced by deriving a correction based on the average number of one or more settled weight samples of sequential dosing cycles, and analyzing the settled weight samples against a preset criteria to determine if another group of settled weight samples and derived correction is necessary. If correction is unnecessary, the settled weight sample process is disabled. Alternatively, the present method can enable the settled weight sampling and attendant correction at the completion of a preset number of dosing cycles without settled weight sampling.

The present method can be practiced such that it enables settled weight sampling with derived average weight correction after a preset time, were no dosing cycles have occurred. The present method can also be practiced by enabling settled weight sampling with derived average weight correction by means of operator or remote control input.

As noted above, the ratio of the two modes of operation of the present system can be adjusted in order to optimize the efficiency of the weighing process. By way of example, the ratio of the first mode of operation versus the second mode of operation can be manually set (input). The value entered is determined "off-line" as the best compromise between production rate and tolerable weight drift from the desired target weight.

Alternatively, the ratio of the first mode of operation to the second mode of operation can be automatically adjusted based upon calculations from dispensed weight data acquired during the second mode of operation, and criteria provided (input) by the user. This provides a self-optimizing feed-back loop that replaces manual adjustment of the ratio.

While the present invention has made reference to a product feed system including a feeder operable at a bulk feed rate, and a dribble feed rate less than the bulk feed rate, it will be appreciated that this is but one configuration of a feeder system that can be employed for practice at the present invention, and the present invention is not limited to use with this specific type of feeder system.

Versatile operation of the present system is facilitated by the capability of operating the system with either manual or automatic adjustment of the ratio between the first and second modes of operation. Manual adjustment of the ratio can be readily effected depending upon the material or product being handled, and processing conditions. Automatic adjustment of the ratio of the two operating modes can be effected based upon manual input of processing conditions or the like, with the controls of the system operated to adjust the ratio based upon calculations from dispensed weight data acquired during the second mode of operation, such as an increase in the standard deviation of the dose weight. Such an increase may dictate an increase in operation in the second, sampling mode.

From the foregoing, it will be observed that numerous modifications and variations can be effected without departing from the true spirit and scope of the novel concept of the present invention. It is to be understood that no limitation with respect to the specific embodiments disclosed herein is intended or should be inferred. The disclosure is intended to cover by the appended claims all such modifications as fall within the scope of the claims.

What is claimed is:

1. A method of cyclically weighing quantities of flowable product, comprising the steps of:
   providing a feeder for supplying a stream of said product;
   providing a weighing device for weighing a quantity of said product;
   cyclically operating said feeder to periodically feed a quantity of said product from said feeder to said weighing device to provide a dose weight of said product; and
   cyclically dispensing the quantity of product providing said dose weight from the weighing device,
   including operating said feeder and weighing device in a ratio of two independent, modes of operation, including:
   (1) a first, non-sampling mode of operation having a relatively high cycle rate, wherein during each cycle of operation the quantity of material is dispensed from said weighing device without verification of the dose weight of the quantity of product received by the weighing device during the feeding step, and (2) a second, sampling mode of operation having a relatively lower cycle rate, wherein during each cycle of operation the quantity of material is dispensed from the weighing device after the dose weight of the quantity of product received in the weighing device is verified by comparison to a target weight; and
   adjusting the dose weight of the product in response to the variation of the dose weight from the target weight as determined by the verification of the dose weight in said second mode of operation; and/or
   adjusting the rate at which said feeder supplies said product to said weighing device in response to variation of the dose weight from said target weight as determined by the verification of the dose weight in said second mode of operation.

2. A method of cyclically weighing quantities of flowable product in accordance with claim 1, including manually adjusting said ratio of said two modes of operation.

3. A method of cyclically weighing quantities of flowable product in accordance with claim 1, including
automatically adjusting said ratio of said two modes of operation based upon from dispensed weight data acquired during said second mode of operation.

4. A method of cyclically weighing quantities of flowable product in accordance with claim 1, including
operating said feeder and weighing device in said first mode of operation for greater periods of time than in said second mode of operation.

5. A method of cyclically weighing quantities of flowable product in accordance with claim 4, including
operating said feeder and weighing device in said second mode of operation no more than about 20% of the time of operation.

6. A method of cyclically weighing quantities of flowable product in accordance with claim 1, wherein
said weighing device comprises a net weigher, and said dispensing step includes dispensing said quantity of product from said net weigher.

7. A method of cyclically weighing quantities of flowable product in accordance with claim 1, including
said weighing device comprises a gross weigher, and said dispensing step includes removal of a container, into which said quantity of product is fed, from said gross weigher.

8. A method of cyclically weighing quantities of flowable product in accordance with claim 1, wherein
during said second, sampling mode of operation, said quantity of product and weighing device are permitted to stabilize before the weight of the product is verified.

9. A method of cyclically weighing quantities of flowable product in accordance with claim 1, including
cyclically operating said feeder at a bulk feed rate, and subsequently at a dribble feed rate less than said bulk feed rate.

* * * * *